United States Patent
Shulman et al.

(10) Patent No.: US 6,174,559 B1
(45) Date of Patent: Jan. 16, 2001

(54) GLUTEN-DERIVED COLLOIDAL DISPERSIONS AND EDIBLE COATINGS THEREFROM AND METHOD OF MAKING

(75) Inventors: Mark L. Shulman, Waltham; Noel G. Rudie, Chelmsford; Francis M. Mallee, Acton; Mark G. Duda, Lynn, all of MA (US)

(73) Assignee: Opta Food Ingredients, Inc., Bedford, MA (US)

(*) Notice: Under 35 U.S.C. 154(b), the term of this patent shall be extended for 0 days.

(21) Appl. No.: 09/220,834

(22) Filed: Dec. 24, 1998

(51) Int. Cl.$^7$ ............................................ A23J 3/00

(52) U.S. Cl. ............................ 426/656; 426/28; 426/49; 426/52; 426/93; 426/94; 426/102; 426/292; 426/293

(58) Field of Search ........................ 426/28, 49, 52, 426/656, 293, 102, 93, 94, 292

(56) References Cited

U.S. PATENT DOCUMENTS

| | | | |
|---|---|---|---|
| 2,311,485 | 2/1943 | Sturken | 106/153 |
| 2,377,237 | 5/1945 | James | 106/153 |
| 2,475,133 | 7/1949 | Furter et al. | 99/11 |
| 2,791,509 | 5/1957 | Cosler | 426/302 |
| 3,314,800 | 4/1967 | Noznick et al. | 99/127 |
| 3,323,922 | 6/1967 | Durst | 99/166 |
| 3,479,191 | 11/1969 | Cole | 426/303 |
| 3,615,715 | 10/1971 | Mullen | 106/150 |
| 3,653,925 | 4/1972 | Anker et al. | 426/302 |
| 3,782,964 | 1/1974 | Knight et al. | 426/364 |
| 3,840,676 | 10/1974 | Yamamoto | 426/89 |
| 3,991,218 | 11/1976 | Earle et al. | 426/250 |
| 4,066,796 | 1/1978 | McKee | 426/302 |
| 4,224,219 | 9/1980 | Van Blanton et al. | 106/149 |
| 4,267,275 * | 5/1981 | Müller | 426/52 |
| 4,293,572 | 10/1981 | Silva et al. | 426/19 |
| 4,543,370 | 9/1985 | Porter et al. | 424/440 |
| 4,820,533 | 4/1989 | Seaborne et al. | 426/76 |
| 4,876,094 | 10/1989 | Benton et al. | 426/472 |
| 4,876,097 | 10/1989 | Autant et al. | 426/656 |
| 4,942,043 | 7/1990 | Sander | 426/2 |
| 5,021,248 | 6/1991 | Stark et al. | 426/531 |
| 5,182,130 | 1/1993 | Haralampu et al. | 427/3 |
| 5,324,351 | 6/1994 | Oshlack et al. | 106/153 |
| 5,705,207 | 1/1998 | Cook et al. | 426/89 |
| 5,736,178 | 4/1998 | Cook et al. | 426/93 |
| 5,912,031 * | 6/1999 | Fitchett et al. | 426/52 |
| 5,965,708 | 10/1999 | Bassi et al. | 530/374 |

FOREIGN PATENT DOCUMENTS

| | | |
|---|---|---|
| 831943 | of 1970 | (CA) . |
| 0 585 688 A3 | 3/1994 | (EP) . |
| 0 593 123 A1 | 4/1994 | (EP) . |
| 1323056 | 2/1963 | (FR) . |
| 80/00659 | 4/1980 | (WO) . |
| 89/05589 | 6/1989 | (WO) . |
| 90/03123 | 4/1990 | (WO) . |
| 91/06227 | 5/1991 | (WO) . |
| 93/12667 | 7/1993 | (WO) . |

OTHER PUBLICATIONS (abstract) Taufel et al. "Enymatic modification of Proteins"*Nahrung* 30 (314) 442–443, 1986.*
AFP 2000, "Acid Fungal Protease for Protein Hydrolysis", *Genencor International*, Product No. 4228 (7 pp.).
Batey, I.L., "Enzymatic Solubilization of Wheat Gluten", *J. Appl. Biochem.*, 7:423–429 (1985).
Nouri et al., "Enzymatic Hydrolysis of Wheat Gluten, Part I. Enzymatic Kinetics and Study of Limited Hydrolysis in a Batch Stirred Reactor", *Chem. Eng. J.*, 65:187–194 (1997).
Nouri et al., "Enzymatic Hydrolysis of Wheat Proteins, Part 2: Comparison of Performance of Batch–Stirred and Torus Reactors", *Chem. Eng. J.*, 65:195–199 (1997).
Masson et al., "Limited Hydrolysis of Gamma–gliadin by Pepsin: Fractionation and Partial Characterization of Large Polypeptides", *Academic Press Limited*, pp. 157–163 (1989).
Masson et al., "Peptic Hydrolysis of Gluten, Glutenin and Gliadin from Wheat Grain: Kinetics and Characterization of Peptides", *J. Sci. Agric.*, 37:1223–1235 (1986).
International Search Report, PCT/US90/06441.
Gontard et ., "Edible Wheat Gluten Films: Influence of the Main Process Variables . . . ," *Journal of Food Science*, 57(1) :190–199 (1992).
Gontard et al., "Edible Composite Films of Wheat Gluten and Lipids: Water Vapor Permeability . . . ," *Int.l J. of Food Science and Tech*. 29:39–50 (1994).
Shogren et al., "Functional (Bread making) and Biochemical Properties of Wheat Flour . . . ," *Cereal Chemistry* 46(2) : 93–102 (March 1969).
N. Gontard, "Edible and Biogradable Films: Study of Wheat Gluten Film–Forming Properties," *C.R. Acad. Agric. Fr.*, 80(4) :109–117 (May 25, 1994).
Gontard et al., "Water and Glycerol As Plasticizers Affect Mechanical and Water Vapor . . . ," *J. of Food Science*, 58(1) :206–211 (1993).
L. Krull and G.E. Inglett, "Industrial Uses of Gluten," *Cereal Science*, 16(8) :232–236, 261 (Aug. 1971).
A. Gennadios and C.L. Weller, "Edible Films and Coatings from Wheat and Corn Proteins," *Food Technology*, pp. 63–69 (Oct. 1990).
F. Macritchie, "Studies of the Methodology for Fractionation and Reconstitution of Wheat Flours, " *J. of Cereal Science*, 3:221–230 (1985).

(List continued on next page.)

Primary Examiner—Helen Pratt
(74) *Attorney, Agent, or Firm*—Hamilton, Brook, Smith & Reynolds, P.C.

(57) ABSTRACT

Film forming colloidal dispersions containing gluten-derived proteins and peptides and their methods of manufacture are described. The colloidal dispersion can be coated onto a variety of substrates to provide a glossy sheen to the substrate. The colloidal dispersions can function as an adhesive for adhering particles onto the substrate. Foods coated with the colloidal dispersion are also described.

33 Claims, No Drawings

OTHER PUBLICATIONS

J.A. Bietz and J.S. Wall, "The Effect of Various Extractions on the Subunit Composition...," *American Assoc. of Cereal Chemists,* pp. 145–155 (1975).

Weegles et al., "Large–Scale Separation of Gliadins and Their Bread–Making Quality," *J. of Cereal Science,* 20:253–264 (1994).

Khan et al., "Disaggregation of Glutein with Low Concentrations of Reducing . . . ," *Cereal Chemistry,* 71(3) : 242–247 (1994).

S. Okamoto, "Factors Affecting Protein Film Formation," *Cereal Science Today,* 23 (5) :256–262 (May 1978).

Gontard et al., "Edible Films and Coatings From Natural Biopolymers," University de Montpellier II, GBSA.

* cited by examiner

GLUTEN-DERIVED COLLOIDAL DISPERSIONS AND EDIBLE COATINGS THEREFROM AND METHOD OF MAKING

BACKGROUND

Egg wash is typically used as a baking gloss for enhancing the appearance of breads, pies, cakes and other baked goods. However, with the growing concern of Salmonella contamination of processing equipment and food, alternative compositions that provide good gloss finishes on edible substrates are desirable.

SUMMARY OF THE INVENTION

The present invention relates to methods of forming colloidal dispersions containing microparticles of gluten-derived proteins and peptides. The colloidal dispersions can be maintained as stable, homogeneous dispersions under storage conditions (e.g., ambient, cold or frozen) without microbial contamination. Alternatively, the colloidal dispersions can be dried and rehydrated prior to use.

Colloidal dispersions of the present invention, when cast onto a substrate, form a glossy coating when dried at ambient or elevated temperatures. The films can further serve as an adhesive for adhering particulate material (e.g., seeds, salts, spices, confections, fruit) onto the substrate. Suitable substrates include but are not limited to confections, cooked and dehydrated meats, dessert items, snack foods (e.g., pretzels, chips, tortillas), fried foods (e.g., french fries), candies (e.g., chocolates), fruit (e.g., apples), vegetables, cereals, baked goods, seeds, nuts, beans (e.g., coffee), pharmaceuticals (e.g., vitamins and tablets) and paper.

Edible coatings produced by the present method are clear films which are non-toxic since they are derived from gluten from wheat, corn, rye, barley, rice or sorghum. The colloidal dispersions of the present invention do not contain toxic organic solvents, thus, the residues of these undesirable elements are minimized or eliminated.

DETAILED DESCRIPTION OF THE INVENTION

The invention pertains to aqueous colloidal dispersions of gluten-derived proteins and peptides, which when coated onto a substrate will impart a glossy coating thereon. The invention further pertains to methods for making the aqueous gluten-derived colloidal dispersions, to methods for using the gluten-derived colloidal dispersions as a baking gloss, for example, and to edible coatings on various substrates, included foods, pharmaceuticals and paper. The invention further pertains to methods for adhering edible particulate material (e.g., seeds, spices, candies, nuts) onto the surface of a substrate using the colloidal dispersions described herein.

The term "colloidal dispersion" as used herein means a suspension of microparticles of gluten-derived proteins and peptides having a median volume diameter of about 10 microns or less in an aqueous medium. Preferably, the gluten-derived microparticles will be from about 4 to about 5 microns and should be essentially free of starch. The terms "stable" and "homogeneous" as used herein define colloidal dispersions in which substantially all the microparticles of gluten-derived proteins and peptides can remain uniformly dispersed within the aqueous medium for an indefinite period of time under storage conditions, without irreversible precipitation or agglomeration.

Gluten usefull in the methods of this invention is found in high concentrations in various grains, such as wheat, corn, rye, barley, rice and sorghum, and in other plant sources. Natural wheat gluten and vital wheat gluten are particularly preferred in the methods of this invention.

In one embodiment of the invention, an aqueous colloidal dispersion of gluten-derived proteins and peptides can be prepared by first dispersing gluten in an aqueous medium at a temperature sufficient to hydrate the gluten. Preferably, gluten is added to an aqueous medium (e.g., water) which has been heated to a temperature sufficient to disperse the gluten in the aqueous medium, under agitating conditions. A preferred temperature for adequate dispersion is from about 20° C. to about 75° C., with 45° C. being most preferred. As the gluten becomes dispersed within the aqueous medium, the viscosity of the dispersion increases. Therefore, the amount of gluten that can be dispersed in the aqueous medium will be dictated by the desired viscosity and the further processing steps described herein. For example, the amount of gluten which can be dispersed in the aqueous medium will be from about 10% to about 35% solids, with from about 14% to about 17% solids being most preferred. When adding gluten in the higher solids range, gradual addition of gluten into the aqueous medium is desirable, and will be described in detail below. For purposes of the present invention, "aqueous medium" is defined as water or a solution which is substantially water such as buffer, acid, antioxidant, reducing agent, and/or chelating agent solutions. It is preferred that the aqueous medium, such as water, be pretreated to remove dissolved minerals.

In order to facilitate dispersion of gluten, it is desirable to acidify the aqueous medium to a pH of from about 3 to about 4 using organic and/or mineral acids (e.g., acetic acid, tartaric acid, citric acid, phosphoric acid, hydrochloric acid, lactic acid), with acetic acid and phosphoric acid being preferred. The acid can be added to the aqueous medium prior to, during or after addition of the gluten. The viscosity of the gluten dispersion can be controlled by gradually adding acid to the gluten dispersion early in the reaction. See Example 2.

The resulting aqueous dispersion is treated, under agitation, with a protease to hydrolyze protein contained in the dispersion. A suitable protease is one which is operative at acid pH of from about 1.5 to about 5.5, for example acid fungal protease, such as but not limited to AFP 2000 (Genencor International, Rochester, N.Y.; food grade acid fungal protease obtained by a controlled fermentation of *Aspergillus niger* var.; optimum pH of from about 2.5 to about 3.5 at 37° C. according to the manufacturer). The protein hydrolysis step should be carried out for a period of time suitable to achieve a drop in viscosity. Preferably, the protein hydrolysis reaction should be carried out for about 2 to about 3 hours in order to achieve adequate viscosity and gloss properties of the final product. It has been demonstrated that the degree of protein hydrolysis is important in the final gloss properties of the gluten-derived colloidal dispersions.

The degree of viscosity can be obtained by measuring the time (seconds) that it takes to empty a #2 Zahn cup for monitoring the process or using a Brookfield viscometer for the final product. A preferred viscosity is a gluten dispersion that takes about 16 to about 18 seconds to empty a #2 Zahn cup (Paul N. Gardner Co., Inc., Pompano Beach, Fla.) at 45° C. It is desirable to achieve a viscosity that is compatible with the method by which the colloidal dispersion will be applied to the substrate to be coated. For example, the viscosity should be adequate to atomize the colloidal dispersion through a spray nozzle, e.g., 45 cP for a hand held sprayer; up to 100 cP for a pressurized commercial sprayer.

The degree of gloss is dependent upon the microparticle size of the gluten-derived proteins and peptides. This is controlled by the degree of hydrolysis of the gluten. Adequate gloss properties are based, in part, upon the substrate to be coated and the type of finish desired. Gloss can be measured using known techniques such as by the methods described in the Examples Section. For example, a liquid sample is coated onto a opacity display gloss board and the gloss measurement taken at a 20° angle using a BYK-Gardner Micro-TRI-gloss reflectometer (BYK-Gardner Inc., Silver Spring, Md.) The fraction of light reflected is measured.

After protein hydrolysis is completed to the desired degree, the aqueous colloidal dispersion is heated to a temperature sufficient to gelatinize the starch contained in the gluten such that it can be hydrolyzed in a subsequent treatment step. The temperature should be from about 65° C. to about 95° C. At these temperatures, the protease will become deactivated. The gelatinization step should be carried out for from about 30 minutes to about 60 minutes to render all of the starch available for subsequent hydrolysis since the end desired product should be essentially free of starch. The presence of starch destroys the gloss properties of the product and therefore its removal is important. The term "gelatinization" or variant thereof is intended to embrace the generally recognized term but also is intended to encompass the process of rupturing essentially all starch granules present in the starch, thereby releasing amylose and amylopectin. For the purpose of the present invention, the term "solubilize" refers to the absence of any detectable particulate matter, especially partially disrupted starch granules, when viewed under 200 to 400-fold magnification using a standard light microscope.

Next, the gluten-derived colloidal dispersion is cooled to a temperature suitable for enzymatic hydrolysis of the starch contained in the gluten. The purpose of this step is to completely digest the starch to glucose. The preferred enzyme is a glucoamylase, such as Optidex L-300 (Genencor International, Inc., Rochester, N.Y.) and AMG (amyloglucosidase; Novo Nordisk). The starch hydrolysis step is carried out for a period of time sufficient to remove essentially all starch from the colloidal dispersion and under conditions operative for the glucoamylase. Preferably, the temperature is from about 65° C. to about 85° C. The amount of starch removed or hydrolyzed can be ascertained using the modified iodine assay described in detail below in the Examples section. When the reaction is completed to the desired degree, the gluten-derived dispersion is heated to a temperature suitable to inactivate the enzyme. The enzyme inactivation step, however, is optional.

The resultant colloidal dispersion is cooled and then optionally diluted to a solids content which is suitable for end use. For example, the colloidal dispersion is diluted to achieve a total solids of from about 10% to about 17% by weight In one embodiment, it is desirable to add a stabilizing agent to improve freeze/thaw properties (e.g., fructose, maltose or other sugars). The addition of fructose in amounts of from about 10% to about 30% by weight of solids allows the colloidal dispersion to be stabily maintained under freeze and thaw cycles. It has also been shown that the addition of fructose improves the gloss of the final product compared to similar colloidal dispersion absent fructose.

In another embodiment of the process, it is possible to achieve a high concentration of gluten-derived solids by slowly metering gluten into an aqueous medium, under agitating conditions, preferably at a temperature sufficient to disperse the gluten therein. The gluten is added concurrent with the protein hydrolysis step such that as the protein is hydrolyzed and the viscosity drops, additional amounts of gluten can be added and the cycle repeated until the desired concentration of gluten is achieved. According to this embodiment, the percent solids can be from about 25% to about 35% by weight.

In yet another embodiment of the process, after protease hydrolysis is completed to the desired degree, particulate starch can be physically removed from the gluten by centrifugation. Due to the decreased viscosity of the colloidal dispersion after protein hydrolysis, essentially all starch can be removed under minimal centrifugation conditions. For example, the colloidal dispersion can be centrifuged at from about 2,000 to about 3,000×g for about 5 minutes. The supernatant can then be treated with a starch hydrolyzing enzyme, such as a glucoamylase as described above, to hydrolyze any residual starch contained herein. The centrifugation step provides two advantages. It eliminates the need to gelatinize the starch and it enables the amount of starch hydrolyzing enzymes to be reduced.

Flavors, colors, antioxidants, emulsifiers, oils and/or preservatives (e.g., ascorbic acid, benzoate, sorbate, benzoic acid, sorbic acid, acetic acid) can also be added to achieve a desired result, such as to extend shelf life, reduce or prevent microbial growth and the like. In one embodiment, color can be added to achieve the appearance of egg wash, typically used in the baking industry. Additives which are soluble in water can be incorporated in the coating formulation by direct dissolution in the aqueous medium of the colloidal dispersion. Additives which are insoluble in water may be dispersed by surfactants and added as an emulsion or colloidal dispersion. Examples of insoluble additives include but are not limited to oils, flavors, trace minerals, vitamins, nutrients or nutraceuticals (e.g., vitamin A, vitamin E).

The colloidal dispersions can be used in various applications in the food, paper and pharmaceutical industries, including as edible coatings or barriers in foods or drugs. Suitable substrates include but are not limited to confections, cooked and dehydrated meats, dessert items, snack foods (e.g., pretzels, tortillas, chips), candies (e.g., chocolates), fruit (e.g., apples), vegetables, baked goods (e.g., buns, pastries, pies bagels, breads), cereals, seeds, nuts (e.g., peanuts, cashews, almonds, macademia), beans (e.g., coffee beans), vitamins, tablets and fried foods (e.g., french fries).

For food and drug purposes, the coating should impart neither significant flavor nor color, so that it does not substantially alter the flavor or appearance of the food or the drug product. Some commercial preparations of gluten-derived proteins may impart a yellow color to the protein suspension or may have an objectionable odor and/or flavor.

The edible coating can be applied to the substrate of choice by any suitable method. Examples of suitable methods include spraying, dipping, pouring, brushing, rolling, extrusion, coprecipitation, or as a composite, whose rheology and composition allows it to be extruded as a film. The gluten-derived colloidal dispersion is applied to the substrate and dried at ambient or elevated temperature to evaporate the water and cause the microparticles to fuse or coalesce into a continuous film.

The present method using a water-based gluten-derived protein colloidal dispersion has several advantages. The colloidal dispersion can be used directly or can be dried to form a stable powder which can be readily reconstituted with water, or other aqueous medium, prior to use. The colloidal dispersion is stable and homogeneous under storage conditions. The colloidal dispersion forms a continuous, durable film upon curing which is colorless, odorless, bland to the taste, non-toxic and provides gloss. The degree of gloss properties of the film is that defined according to generally accepted terms of the painting industry, e.g., matte, semi-gloss, high gloss. The degree of gloss will be dependent upon the substrate to be coated.

The colloidal dispersions of this invention can function as an adhesive for adhering edible particular material onto the substrate's surface. An "edible particulate material" is defined herein to be any edible thing that can be added to the substrate's surface for the purpose of ornamentation, flavoring or coloration. The exact nature of the particulate material will depend upon the food to be coated. Examples of edible particulate materials include, but are not limited to, fruit pieces, confections (e.g., candies, sprinkles), seeds, salt, spices, and combinations thereof. The edible particulate materials can be applied to the substrate immediately upon coating the substrate with the colloidal dispersions of this invention. Alternatively, the substrate can be coated with the colloidal dispersion and allowed to partially dry until the coating is tacky, then the particulate material(s) can be applied.

Film properties of the gluten-derived protein coating can be modified by controlling the concentration of gluten-derived protein in the colloidal dispersion, the mode of application and the number of layers applied. For example, where a thicker coating is desired, either a colloidal dispersion having a higher gluten-derived protein concentration or multiple layers can be applied.

The invention is further illustrated by the following examples which should not be construed as limiting in any way. All references cited herein are incorporated by reference in their entirety.

EXAMPLES

Materials

Product Characterization

Film Properties

1. Physical

ASTM methods were used for measuring drying time (ASTM D1640), gloss (BYK-Gardner MicroTri-Gloss reflectometer) (ASTM D523-95), cross-hatch film adhesion (ASTM D-823).

Gloss was also measured on a hamburger bun as a practical index of its potential as a baking gloss. This was done by spraying a light coating on the surface of the hotbun and then monitoring the rate of drying, dried film continuity, clarity and gloss. One ml of liquid sample is pipetted onto a gloss board (Leneta Company, 9B7-5, 8×11⅜") and coated into a film using a bird film applicator (Leneta Company, AR-5259). The film is dried and gloss is measured using a BYK-Gardner micro-TRI-gloss reflectometer (BYK-Gardner, Inc., Silver Spring, Md.) at a 20° C. angle.

The particle size distribution for the protein microparticles were determined using a Coultor Particle Size Analyzer or a light microscope (Olympus, BH-2) equipped with a BioScan Optimas Image Analyzer.

2. Chemical

A modified iodine test was done by taking 5–7 drops of wheat gluten gloss suspension, and diluting it with 1 ml of water in a small test tube. The liquid was then boiled for several seconds using a bunsen burner flame. The tube was cooled with tap water followed by adding 1–2 drops of a solution containing 0.5% iodine and 0.5% potassium iodide in 50% ethanol. If starch is present a blue color develops (i.e., positive test). If starch is absent, a yellow color develops (negative test). A green color is indicative of a product containing residual or borderline amounts of starch.

3. Sensory

Samples were prepared for sensory evaluation by drying 1 g of gloss on a plastic weighing dish. Each panelist consumed the films and rated the overall preference, acid intensity and off flavor intensity using a hedonic scale from 1–9 (1 corresponding to dislike, low intensity and 9 corresponding to like very much, high intensity). After application to hot buns, gloss levels are elevated by visually scoring from 0 to 5, with 0 representing no gloss and 5 representing excellent gloss.

TABLE 1

|  | Overall Preference | Acid Intensity | Off Flavor Intensity |
| --- | --- | --- | --- |
| Phosphoric Acid | 5.09 | 3.46 | 4.10 |
| Acetic Acid | 2.80 | 6.65 | 6.19 |

4. Viscosity

A. Zahn Cup Measurement

Zahn cups are stainless steel cups of a predetermined volume. Each cup has a calibrated centered hole in the bottom. To measure the viscosity of a slurry, a sample of the protein slurry is collected in a 1 quart container. The Zahn cup is dipped into the quart container and permitted to fill completely. Then the Zahn cup is quickly withdrawn from the slurry. A timer is started when the cup clears the slurry. The timer is stopped the moment the cup empties. The elapsed time is recorded and compared with the calibration curve developed for each cup to determine the viscosity.

B. Brookfield Viscosity

Viscosity can also be measured using a Brookfield viscometer, according to the manufacturer's protocol.

Example 1

Use of Protease and Glucoamylase to Produce Wheat Gluten Gloss

Vital Wheat Gluten (VWG) powder (76 grams) was dispersed with stirring in water (421 grams) at 45±2° C. followed by adding acid fungal protease (AFP 2000; Genencor International, Rochester, N.Y.) (19 mg) and 85% phosphoric acid (3.04 g). Immediately the viscosity became high, but in 5 minutes it dropped dramatically displaying the beginning of the protein hydrolysis. The stirred slurry maintained at said temperature for three hours. After that, the temperature was raised to 90° to 95° C. for 10 minutes to kill the enzyme and gelatinize starch, and then reduced to 65±2° C. followed by addition of a glucoamylase (Optidex L-300; Genencor International, Rochester, N.Y.) (0.27 ml). In 30 minutes when the starch iodine test was negative, benzoic acid (0.4 grams) as a preservative was dissolved, the suspension was cooled down and adjusted to a pH of 3.0 with phosphoric acid. The procedure resulted in a product with high gloss on the various substrates (e.g., 40 on Leneta gloss boards and 4.5 on hot buns).

Example 2

Enzymatic Treatment of Vital Wheat Gluten (VWG) using a Gradual Addition of Acid at Reduced Temperature VWG powder (76 g) and a glucoamylase (Optidex L-300) (0.27 ml) were dispersed with stirring in water (421 g)

having temperature of 65±2° C. and containing 8.5% phosphoric acid (10 ml). Within 30 minutes after preparing the slurry the rest of 8.5% phosphoric acid (20 ml) was added either by small portions or continuously. The stirring was continued at said temperature until starch iodine test was negative (totally 1–1.5 hours). After that, the temperature was reduced to 45±2° C. and acid fungal protease as powder (AFP 2,000)(19 mg) was added as a powder. The stirring was maintained at this temperature for 3 hours. The enzymes were inactivated by heating to 95° C. for 10 minutes, benzoic acid (0.4 g) as a preservative was added, the suspension was cooled down and diluted to 12–14% solids and adjusted to a pH of 3.0 with phosphoric acid. The final product provided a shiny gloss; it could be improved noticeably adding fructose (up to 30% of solids). This procedure allows to avoid the lumps forming as well as a high viscous slurry.

Example 3

Enzymatic Treatment of Vital Wheat Gluten Resulting in High Concentrated Gloss

VWG powder (125 g) was divided in 5 parts (approximately 25 g each) as well as 50 ml of 8.5% phosphoric acid (10 ml each). The first part of gluten (25 g) was dispersed with stirring in water (325 g) at 45±2° C. followed by adding acid fungal protease (AFP 2000) (31 mg) and 8.5% phosphoric acid (10 ml). After the viscosity of the slurry became lower (about 5 minutes), as a result of the enzymatic hydrolysis, the second parts of VWG and phosphoric acid were added. This procedure was repeated every 3 to 7 minutes to maintain acceptable viscosity (forming a vortex at 300–400 rpm); the whole process took about 30 minutes. The slurry was stirred for 2.5 hours, after that the temperature was raised to 90° to 95° C. for 10 minutes and then reduced to 65±2° C. followed by addition of a glucoamylase (Optidex L-300) (0.44 ml). In 30 to 40 minutes when the starch iodine test was negative, benzoic acid (0.4 grams) as a preservative was dissolved, and the suspension was cooled down to give a viscous latex with 25 to 28% solids. When diluted to 12 to 14% and adjusted to a pH of 3.0 with phosphoric acid, it provided high gloss on the various substrates (e.g., 40–45 on Leneta gloss board and 4.5–5.0 scores on hot buns).

Example 4

Use of Centrifugation to Ease the Process of Obtaining Wheat Gluten Gloss

VWG powder (76 grams) was dispersed with stirring in water (421 grams) at 45±2° C. followed by adding acid fungal protease (AFP 2000) (19 mg) and 85% phosphoric acid (3.04 g). In three hours, the slurry was cooled down to ambient temperature and spun down at 3,000 rpm for 10 minutes. In spite of most of starch was isolated as a white dense precipitate, the supernatant had very poor gloss until it was treated with Optidex L-300 (0.12 ml). In 30 minutes, the starch iodine test was negative, indicating complete hydrolysis of the starch. The resulting latex was adjusted to pH 3.0 and gives gloss values over 40 on display gloss boards.

Example 5

Wheat Gluten Gloss Containing High Gluten Solids

A reaction vessel was filled with 20 gallons of reverse osmosis, deionized (RODI) water. To this volume, 1.33 kg of 85% weight phosphoric acid (J. T. Baker) was added. A recirculating loop was attached to the discharge of the reactor through a diaphragm pump, an in-line mixer (Silverson Mixing, East Longmeadow, Mass.) and returning to the reactor. Agitation of the acidified water was sufficient to produce a vortex. The water was heated to 45° C. using the reactor jacket. VWG powder (Manildra Milling Co., Shawnee Mission, Kans.) was added to the reactor slowly. The pump and mixer in the recirculating loop were turned on. After adding one fourth of the gluten (approximately 19 kg), 8.3 gm of protease (AFP 2000) was added. VWG continued to be added slowly while the slurry was circulated through the in-line mixer. The in-line mixer serves to assist the break-up of clumps of VWG and promotes rapid wetting of the powder. VWG addition was completed in 60 minutes. In all 33.2 kg of VWG was added.

The slurry continued to be circulated for another 90 minutes. Temperature was maintained at 45° C. using a circulating water bath for an additional 60 minutes. The total time for protease digestion was three hours.

Steam was added to the protein slurry to raise the temperature from 45° C. to 65° C. (4 min.). An amylase (Optidex L-300) was added to the slurry in the amount of 130 g for 60 minutes. There was still starch present as shown by a positive reaction to iodine. The slurry was heated to 85° C. using injected steam. It was held at 85° C. for 15 minutes and cooled to 65° C. A second dose of Optidex L-300 was added. After 30 minutes, the iodine test was negative for starch. The slurry was heated to 100° C. by injecting steam into the slurry. After one hour at 100° C., the slurry was cooled over a two hour period to 27° C.

A soluiton of fructose (ADM, Decatur, Ill.) (9.5 kg) was prepared using RODI water. It was added to the cooled slurry in a proportion such that the final solids were brought to 17% and the fructose fraction of the solids was 30%. A preservative (sodium benzoate) was added to the diluted solution at a 0.04% level.

Example 6

Wheat Gluten Gloss Containing 28% Solids

A reaction vessel was filed with 20 gallons of RODI water. To this volume, 0.335 kg of 85% weight phosphoric acid (J. T. Baker) was added. A recirculating loop was attached to the discharge of the reactor through a diaphragm pump, an in-line mixer (Silverson Mixing, East Longmeadow, Mass.) and finally the loop returned to the reactor. Agitation of the acidified water was sufficient to produce a vortex. The water was heated to 46° C. using the reactor jacket. VWG powder (Manildra Milling Co., Shawnee Mission, Kans.) was added to the reactor slowly. The pump and mixer in the recirculating loop were turned on. After adding one fourth of the gluten (approximately 8.1 kg), 8.3 g of protease (AFP 2000) was added. Another 8.1 kg of VWG was added slowly while the slurry was circulated through the in-line mixer. Then 0.65 kg of 85% weight phosphoric acid was added. Another 8.1 kg of VWG was added; followed by 0.335 kg of 85% weight phosphoric acid. Finally the last portion of VWG was added. During this time the slurry was circulated through the in-line mixer. The in-line mixer serves to assist the break-up of clumps of VWG and promotes rapid wetting of the powder. VWG addition was completed in 25 minutes. In all, 32.5 kg of VWG was added.

Slurry continued to be circulated for another 110 minutes. Temperature was maintained at 45° C. using a circulating water bath for an additional 60 minutes. The total time for proteinase was three hours following the last addition of VWG.

Steam was added to the protein slurry to raise the temperature from 45° C. to 80° C. (6 mins.) and held at this temperature for 30 minutes. An amylase (Optidex L-300) was added to the slurry in the amount of 381 gm. The enzyme was allowed to work for 60 minutes. At the end of this period, there was still starch present as shown by a positive reaction to iodine. The slurry was heated to 100° C. by injecting steam into the slurry. After one hour at 100° C., the slurry was cooled over a two hour period to 27° C.

A solution of fructose (ADM, Decatur, Ill.) (9.5 kg) was prepared using RODI water. It was added to the cooled slurry in a proportion such that the final solids were brought to 17% and the fructose fraction of the solids was 30%. A preservative (sodium benzoate) was added to the diluted solution at a 0.04% level.

While this invention has been particularly shown and described with references to preferred embodiments thereof, it will be understood by those skilled in the art that various changes in form and details may be made therein without departing from the spirit and scope of the invention as defined by the appended claims.

We claim:

1. A method for producing an aqueous, gluten-derived colloidal dispersion, which upon application to a substrate imparts a gloss thereon, comprising:
    a) preparing an aqueous dispersion of gluten having starch contained therein under agitating conditions;
    b) hydrolyzing protein contained in the gluten using a protease under conditions sufficient to change the gluten dispersion viscosity;
    c) heating the product of step b) to a temperature sufficient to gelatinize the starch contained in the gluten; and
    d) hydrolyzing essentially all starch within the dispersion with a starch hydrolyzing enzyme; thereby producing an aqueous, gluten-derived colloidal dispersion which upon application to a substrate imparts a gloss thereon.

2. The method of claim 1 wherein the gluten is from corn, wheat, barley, rice, rye or sorghum.

3. The method of claim 1 wherein the aqueous gluten dispersion is acidified before, during or after the protease step.

4. The method of claim 1 wherein the protein hydrolysis step is carried out at from about 2 to about 3 hours.

5. The method of claim 1 wherein the gelatinization step is carried out at a temperature of from about 65° C. to about 95° C.

6. The method of claim 1 wherein the starch hydrolyzing enzyme is an enzyme containing glucoamylase, amylase or pullanase having an activity sufficient to hydrolyze the starch to maltose or glucose.

7. The method of claim 1 wherein the starch hydrolysis step is carried out at a temperature of from about 65° C. to 85° C.

8. The method of claim 1, further comprising heating the gluten dispersion after starch hydrolysis is completed to inactivate the starch hydrolyzing enzyme.

9. The method claim 1, further comprising the step of diluting the colloidal dispersion to obtain a total solids content of from about 10% to about 17% by weight.

10. The method of claim 1, further comprising adding a preservative to the final product.

11. The method of claim 1, further comprising adding color and/or flavor to the final product.

12. The method of claim 1 wherein the amount of gluten dispersed in step a) is from about 1% to about 35% by weight solids.

13. The method of claim 1, further comprising admixing a stabilizing agent into the product of step d).

14. An aqueous, gluten-derived colloidal dispersion obtainable by the method of claim 1.

15. A substrate having an edible coating thereon, said coating comprising fused microparticles of a gluten-derived protein and peptides from an aqueous colloidal dispersion, produced by the method of claim 1, in which the liquid phase was removed at ambient or elevated temperature.

16. The coated substrate of claim 15 wherein the substrate is selected from the group consisting of chocolates, high sugar confections, fruits, meats, baked goods, vegetables, seeds, nuts, beans, cereal, vitamins, tablets, fried foods, french fries and snack foods.

17. An edible film derived from an aqueous colloidal dispersion produced by the method of claim 1.

18. A method for adhering edible particulate material onto the surface of a substrate, comprising the steps of:
    a) coating the substrate with an aqueous, gluten-derived colloidal dispersion produced by the method of claim 1; and
    b) applying an edible particulate material onto the coating before the coating completely dries.

19. The method of claim 18 wherein the edible particulate material is selected from the group consisting of fruit pieces, confections, candies, sprinkles, seeds, salt, spices and combinations thereof.

20. A method for producing an aqueous, gluten-derived colloidal dispersion, which upon application to a substrate imparts a gloss thereon, comprising:
    a) preparing an aqueous dispersion of gluten having starch contained therein under agitating conditions;
    b) hydrolyzing protein contained in the gluten using a protease under conditions sufficient to change the gluten dispersion viscosity;
    c) physically removing starch from the dispersion by centrifugation; and
    d) hydrolyzing essentially all residual starch remaining within the dispersion with a starch hydrolyzing enzyme; thereby producing an aqueous, gluten-derived colloidal dispersion, which upon application to a substrate imparts a gloss thereon.

21. The method of claim 20 wherein the aqueous gluten dispersion is acidified before, during or after the protease step.

22. The method of claim 20 wherein the protein hydrolysis step is carried out at from about 2 to about 3 hours.

23. The method of claim 20 wherein the starch hydrolyzing enzyme is an enzyme containing glucoamylase, amylase or pullanase having an activity sufficient to hydrolyze the starch to maltose or glucose.

24. The method of claim 20 wherein the starch hydrolysis step is carried out at a temperature of from about 65° C. to 85° C.

25. The method of claim 20, further comprising heating the gluten dispersion after starch hydrolysis is completed to inactivate the starch hydrolyzing enzyme.

26. The method claim 20, further comprising the step of diluting the gluten dispersion to obtain a total solids content of from about 10% to about 17% by weight.

27. The method of claim 20, further comprising adding a preservative to the final product.

28. The method of claim 20, further comprising adding color and/or flavor to the final product.

29. The method of claim 20 wherein the amount of gluten dispersed in step a) is from about 10% to about 35% by weight solids.

30. The method of claim 20 further comprising admixing a stabilizing agent into the product of step d).

31. An aqueous, gluten-derived colloidal dispersion obtainable by the method of claim 20.

32. A method for making an edible coating on a substrate, comprising the steps of:

a) apply an aqueous, gluten-derived colloidal dispersion produced by the method of claim 1 to a substrate; and b) drying the colloidal dispersion under ambient or elevated temperature to fuse and form an edible continuous coating of gluten-derived protein onto the surface of said substrate.

33. The method of claim 32 wherein the substrate is selected from the group consisting of chocolates, high sugar confections, fruits, meats, baked goods, vegetables, seeds, nuts, beans, cereals, vitamins, tablets, fried foods, french fries and snack foods.

* * * * *